United States Patent
Bernhaupt

(10) Patent No.: US 10,662,915 B2
(45) Date of Patent: May 26, 2020

(54) FUEL-PUMPING DEVICE FOR AN INTERNAL COMBUSTION ENGINE, AND A METHOD FOR PUMPING FUEL IN A FUEL-PUMPING DEVICE

(71) Applicant: Robert Bosch GmbH, Suttgart (DE)

(72) Inventor: Martin Bernhaupt, Oberalm (AT)

(73) Assignee: Robert Bosch GmbH, Stuttgart (DE)

( * ) Notice: Subject to any disclaimer, the term of this patent is extended or adjusted under 35 U.S.C. 154(b) by 13 days.

(21) Appl. No.: 16/320,571

(22) PCT Filed: Jun. 21, 2017

(86) PCT No.: PCT/EP2017/065170
§ 371 (c)(1),
(2) Date: Jan. 25, 2019

(87) PCT Pub. No.: WO2018/019479
PCT Pub. Date: Feb. 1, 2018

(65) Prior Publication Data
US 2019/0242350 A1    Aug. 8, 2019

(30) Foreign Application Priority Data
Jul. 25, 2016 (DE) ........................ 10 2016 213 595

(51) Int. Cl.
*F02M 63/00* (2006.01)
*F02M 63/02* (2006.01)
(Continued)

(52) U.S. Cl.
CPC ......... *F02M 63/027* (2013.01); *F02D 19/105* (2013.01); *F02D 41/0025* (2013.01);
(Continued)

(58) Field of Classification Search
CPC ............. F02M 63/027; F02M 63/0235; F02M 63/0245; F02D 41/3836; F02D 41/3845;
(Continued)

(56) References Cited

U.S. PATENT DOCUMENTS 5,794,586 A * 8/1998 Oda ...................... F02D 33/006
123/305
5,878,718 A * 3/1999 Rembold .............. F02D 33/006
123/198 D (Continued)

FOREIGN PATENT DOCUMENTS

| DE | 102008051931 | 4/2010 |
|---|---|---|
| DE | 102010061183 | 6/2012 |
| DE | 102012200706 | 7/2013 |

OTHER PUBLICATIONS

International Search Report for Application No. PCT/EP2017/065170 dated Oct. 11, 2017 (English Translation, 2 pages).

*Primary Examiner* — Thomas N Moulis
(74) *Attorney, Agent, or Firm* — Michael Best & Friedrich LLP

(57) ABSTRACT

The invention relates to a fuel-pumping device (1) for a fuel injection device of an internal combustion engine with a large high-pressure pump (16) and a small high-pressure pump (14) arranged in parallel, wherein fuel can be pumped by the large high-pressure pump (16) and by the small high-pressure pump (14) from a low-pressure region (13) into a high-pressure region (18). The high-pressure region (18) is connected to at least one injector (21). A control device (30) is provided, which can be used to conduct the entire pump output of the large high-pressure pump (16) or the small high-pressure pump (14) into the low-pressure region (13) via a discharge line (15).

12 Claims, 3 Drawing Sheets

(51) Int. Cl.
*F02D 41/38* (2006.01)
*F02D 19/10* (2006.01)
*F02D 41/00* (2006.01)
*F02B 7/06* (2006.01)

(52) U.S. Cl.
CPC ..... *F02D 41/3845* (2013.01); *F02M 63/0045* (2013.01); *F02M 63/0047* (2013.01); *F02M 63/0245* (2013.01); *F02B 7/06* (2013.01); *F02D 41/0027* (2013.01); *F02D 2400/08* (2013.01); *F02M 63/0054* (2013.01); *Y02T 10/36* (2013.01)

(58) Field of Classification Search
CPC ............. F02D 41/3854; F02D 41/3863; F02D 2041/3881; F02D 41/0025
See application file for complete search history.

(56) References Cited

U.S. PATENT DOCUMENTS

| | | | |
|---|---|---|---|
| 5,890,459 A | 4/1999 | Hedrick et al. | |
| 6,889,656 B1* | 5/2005 | Rembold | F02D 41/062 123/446 |
| 2005/0188958 A1* | 9/2005 | Klenk | F02M 37/04 123/458 |
| 2007/0283935 A1* | 12/2007 | Yuda | F02D 41/065 123/497 |
| 2008/0171242 A1* | 7/2008 | Osada | H01M 8/04022 48/61 |
| 2011/0023830 A1* | 2/2011 | Haas | F02D 33/006 123/446 |
| 2011/0214642 A1* | 9/2011 | Shafer | F02M 63/0285 123/456 |
| 2013/0291836 A1* | 11/2013 | Klesse | F02D 41/3854 123/458 |
| 2016/0084172 A1* | 3/2016 | Ten Broeke | F02D 41/3845 123/468 |
| 2017/0241352 A1* | 8/2017 | Kurotani | F02D 19/0655 |
| 2017/0298850 A1* | 10/2017 | Kurtz | F02D 19/0665 |
| 2017/0342936 A1* | 11/2017 | Pursifull | F02D 41/3845 |
| 2018/0010535 A1* | 1/2018 | Posselt | F02D 41/3064 |
| 2018/0320607 A1* | 11/2018 | Magnusson | F02M 25/12 |
| 2018/0320648 A1* | 11/2018 | Fischer | F02M 37/18 |
| 2018/0347456 A1* | 12/2018 | Magnusson | F02B 43/12 |

\* cited by examiner

FUEL-PUMPING DEVICE FOR AN INTERNAL COMBUSTION ENGINE, AND A METHOD FOR PUMPING FUEL IN A FUEL-PUMPING DEVICE

BACKGROUND OF THE INVENTION

The invention relates to a fuel-pumping device for a fuel injection unit of an internal combustion engine and a method for pumping fuel in a fuel-pumping device.

A fuel-pumping device of this type is known from DE 10 2012 200 706 A1. Said fuel-pumping device comprises a delivery pump, by means of which fuel is pumped to the intake side of a high-pressure pump. By means of the high-pressure pump, fuel is pumped into a high-pressure region, from which at least one injector of the fuel injection unit is supplied with fuel at least indirectly. Between the delivery pump and the intake side of the high-pressure pump, a bypass connection discharges to a low-pressure region.

SUMMARY OF THE INVENTION

The fuel-pumping device according to the invention has the advantage that, by controlling the total pump output of the large high-pressure pump or the small high-pressure pump into the low-pressure region via a discharge line, a particularly good adaptation to the respective fuel requirements is made possible according to the operating mode of a dual-fuel motor.

In the case of a dual-fuel motor, during operation with gaseous fuel (gas operation), only a small amount of liquid fuel is required to achieve the ignition.

During operation of the dual-fuel motor with liquid fuel (liquid fuel operation), by contrast, a large amount of liquid fuel is required, which must be transported by the fuel-pumping device.

The fuel-pumping device according to the invention allows the pumping of very small amounts of liquid fuel for gas operation of the dual-fuel motor and the pumping of very large amounts of fuel for liquid fuel operation. In this case, the small amounts of liquid fuel in gas operation can be only 0.5% to 5% of the amount of fuel during liquid fuel operation.

By using a large high-pressure pump and a small high-pressure pump which are connected in parallel with one another, wherein the large high-pressure pump pumps into the low-pressure region during gas operation, overheating of the high-pressure pump as a result of fuel throughput being too low can be prevented. Furthermore, cavitation problems in valves as a result of an amount of fuel being too small or pressure regulation problems as a result of very low utilization of the large high-pressure pump can be prevented.

It is advantageous for the maximum pump output of the large high-pressure pump to be at least two times, preferably ten times, greater than the maximum pump output of the small high-pressure pump, since the required amount of fuel can thus be covered by the respective operating mode.

It is advantageous for the control unit to be a valve, in particular a 4/2-way valve, which comprises two positions so that in a first position, a connection between a discharge side of the large high-pressure pump and the high-pressure region and a connection between a discharge side of the small high-pressure pump and the discharge line is released, and in a second position, a connection between a discharge side of the small high-pressure pump and the high-pressure region and a connection between the discharge side of the large high-pressure pump and the discharge line is released.

The discharge side of the large high-pressure pump can be connected either to the discharge line or the high-pressure region by means of the control unit. In this manner, during gas operation, when the high-pressure pump is connected to the discharge line, a zero pumping of the large high-pressure pump into the low-pressure region is possible so that the large high-pressure pump is further flushed with fresh fuel, and problems as a result of the pump output being too low are prevented. In the case of a connection to the discharge line (zero pumping), the discharge pressure of the large high-pressure pump is lowered to the pressure level in the low-pressure region so that the drive power of the large high-pressure pump is also reduced, and energy can be saved.

To prevent a complex construction of the fuel-pumping device, it is advantageous for the small high-pressure pump to be connected to the high-pressure region by means of an ignition line.

It is advantageous for the control unit to be a valve, in particular a 3/2-way valve, which comprises two positions so that in a first position, a connection between the discharge side of the large high-pressure pump and the high-pressure region is released, and in a second position, a connection between the discharge side of the large high-pressure pump and the discharge line is released, since these two alternative states can be achieved by a single component.

A flush valve which is arranged in the discharge line is advantageous as a control unit as a result of the simplicity thereof, the discharge line being arranged between a non-return valve and the large high-pressure pump in a high-pressure connection.

The small high-pressure pump can advantageously be mechanically coupled to the large high-pressure pump and driven by means of said pump to cut down on additional mechanical interfaces.

BRIEF DESCRIPTION OF THE DRAWINGS

Preferred exemplary embodiments of the invention are shown in the drawings and explained in greater detail in the following description.

In said drawings.

DETAILED DESCRIPTION

Figure 1:
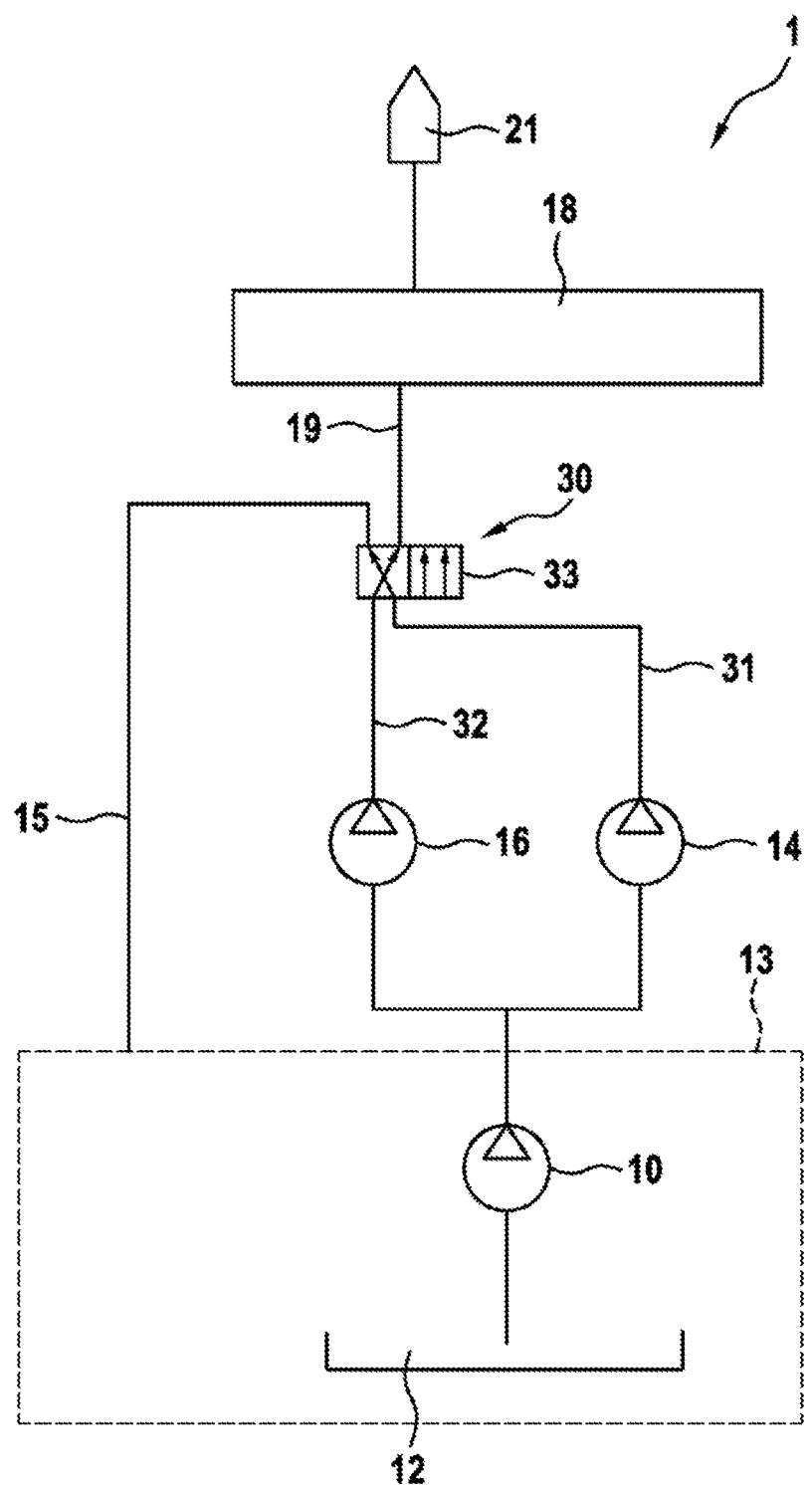
FIG. 1 is a schematic view of a fuel-pumping device of an internal combustion engine according to a first exemplary embodiment.

FIG. 1 shows a fuel injection unit of an internal combustion engine which comprises a fuel-pumping device 1. The fuel-pumping device 1 comprises at least one large high-pressure pump 16 and one small high-pressure pump 14, which are arranged in parallel. By means of the at least one large high-pressure pump 16 and the small high-pressure pump 14, fuel can be pumped into a high-pressure region 18 of the fuel injection unit.

The high-pressure region 18 has for example a high-pressure accumulator. From the high-pressure region 18, one or more injectors 21 are supplied with fuel, at least one injector 21 being assigned to each cylinder of the internal combustion engine.

A control unit 30 is arranged in the fuel-pumping device 1, which unit can control the total pump output of the large high-pressure pump 16 or the total pump output of the small high-pressure pump 14 by means of a discharge line 15 into the low-pressure region 13.

The low-pressure region 13 has at least one delivery pump 10, which pumps fuel from a storage container 12 to the intake side of the large high-pressure pump 16 and to the intake side of the small high-pressure pump 14. Additional lines, valves and filters can also be arranged in the low-pressure region 13. Since the elements can be arranged in the low-pressure region 13 as desired, in the following, said region is referred to only as the low-pressure region 13.

The fuel-pumping device pumps different amounts of fuel into the high-pressure region 18 according to the respective operating modes of a dual-fuel motor. If the dual-fuel motor is operated with liquid fuel (liquid fuel operation), then a large amount of liquid fuel must be pumped into the high-pressure region 18 and to the injector 21 by the fuel-pumping device 1. This is made possible by the operation of the large high-pressure pump 16, which has a greater maximum pumping volume than the small high-pressure pump 14.

If the fuel-pumping device 1 is in liquid fuel operation, then the control unit 30 is controlled in such a way that the total pump output of the large high-pressure pump 16 is pumped into the high-pressure region 18, whereas the total pump output of the small high-pressure pump 14 is either controlled by means of the discharge line 15 or additionally pumped into the high-pressure region 18.

If the dual-fuel motor is operated with gaseous fuel (gas operation), then only a small amount of liquid fuel has to be pumped by the fuel-pumping device 1 into the high-pressure region 18 and to the injector 21 to ignite the gaseous fuel. This small amount of fuel can be delivered to the injector 21 only by the small high-pressure pump 14.

If the fuel-pumping device 1 is in gas operation, then the control unit 30 is controlled in such a way that the total pump output of the large high-pressure pump 16 is controlled by means of the discharge line 15 into the low-pressure region 30, whereas the total pump output of the small high-pressure pump 14 is pumped into the high-pressure region 18.

The maximum pump output of the large high-pressure pump 16 is at least two times, preferably ten times, greater than the maximum pump output of the small high-pressure pump 14. In another embodiment, the maximum pump output of the large high-pressure pump 16 is at least twenty times greater than the maximum pump output of the small high-pressure pump 14.

The above-mentioned arrangements and explanations are valid for all the following exemplary embodiments.

According to a first exemplary embodiment, the control unit 30 is a first way valve 33, in particular a 4/2-way valve 33, which comprises two positions and an ignition line 31 which is connected to the intake side of the small high-pressure pump 14, and a pump line 32 which is connected to the intake side of the large high-pressure pump 16, connects to the discharge line 15 and a high-pressure line 19, which opens into the high-pressure region 18.

In a first position of the first way valve 33, a connection between a discharge side of the large high-pressure pump 16 and the high-pressure region 18 and a connection between a discharge side of the small high-pressure pump 14 and the discharge line 15 is released. In the first position of the first way valve 33, the ignition line 31 and the discharge line 15 are interconnected, and the pump line 32 and the high-pressure line 19 are interconnected.

In a second position of the first way valve 33, a connection between the discharge side of the small high-pressure pump 14 and the high-pressure region 18 and a connection between the discharge side of the large high-pressure pump 16 and the discharge line 15 is released. In the second position of the first way valve 33, the ignition line 31 and the high-pressure line 19 are interconnected, and the pump line 32 and the discharge line 15 are interconnected.

Figure 2:
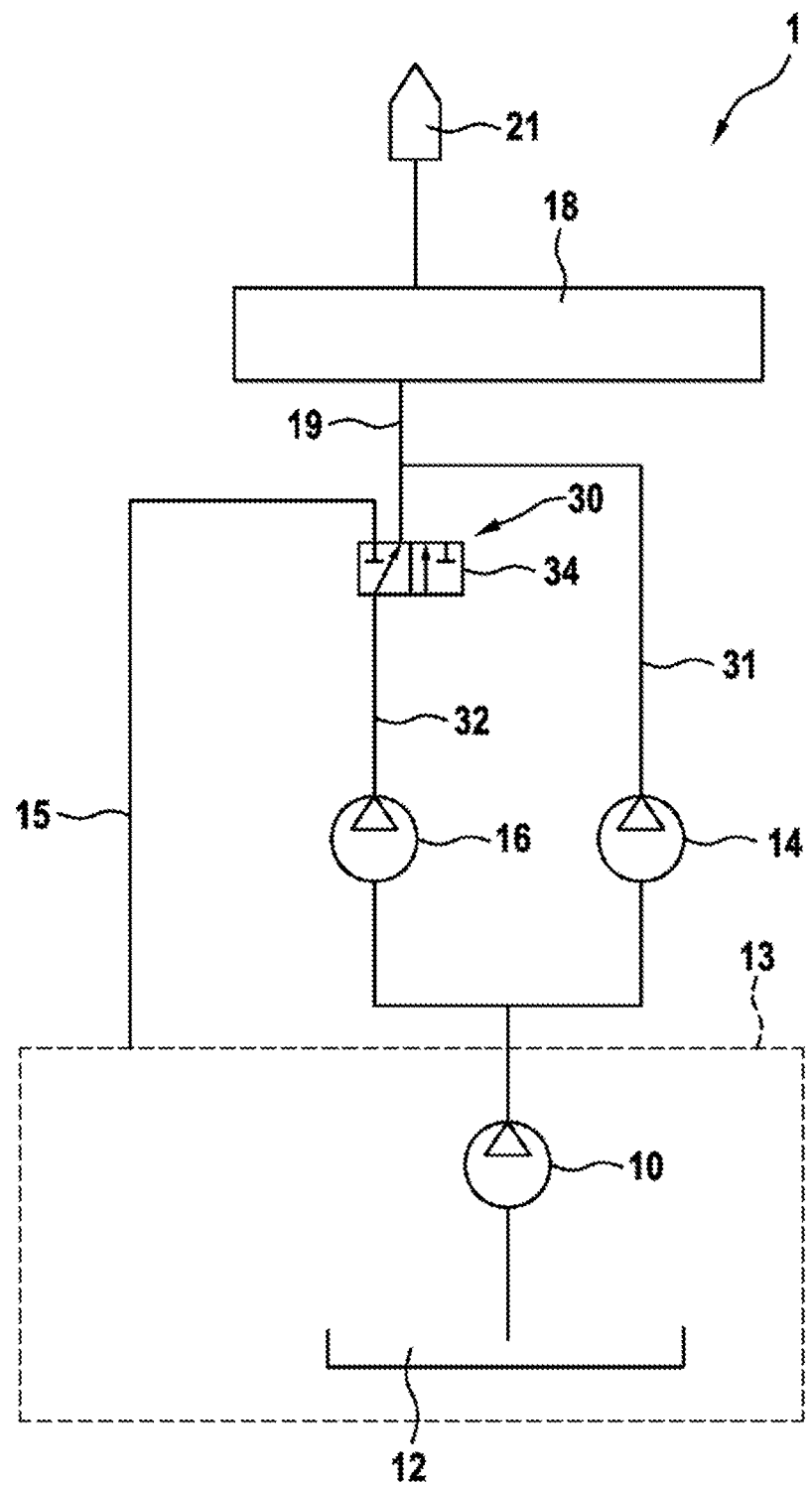
FIG. 2 is a schematic view of a fuel-pumping device of an internal combustion engine according to a second exemplary embodiment.

FIG. 2 shows a second exemplary embodiment. The control unit 30 is a second way valve 34, in particular a 3/2-way valve 34, which comprises two positions and the pump line 32 which is connected to the intake side of the large high-pressure pump 16, connects either to the discharge line 15 or the high-pressure line 19, which opens into the high-pressure region 18.

In a first position of the second way valve 34, a connection between the discharge side of the large high-pressure pump 16 and the high-pressure region 18 is released, and in a second position of the second way valve 34, a connection between the discharge side of the large high-pressure pump 16 and the discharge line 15 is released.

In the first position of the second way valve 34, the pump line 32 and the high-pressure line 19 are interconnected, and in the second position of the second way valve 34, the pump line 32 and the discharge line 15 are interconnected.

The discharge side of the small high-pressure pump 14 is always connected to the high-pressure region 18. An ignition line 31 connects the small high-pressure pump 14 to the high-pressure line 19, which opens into the high-pressure region 18.

Figure 3:
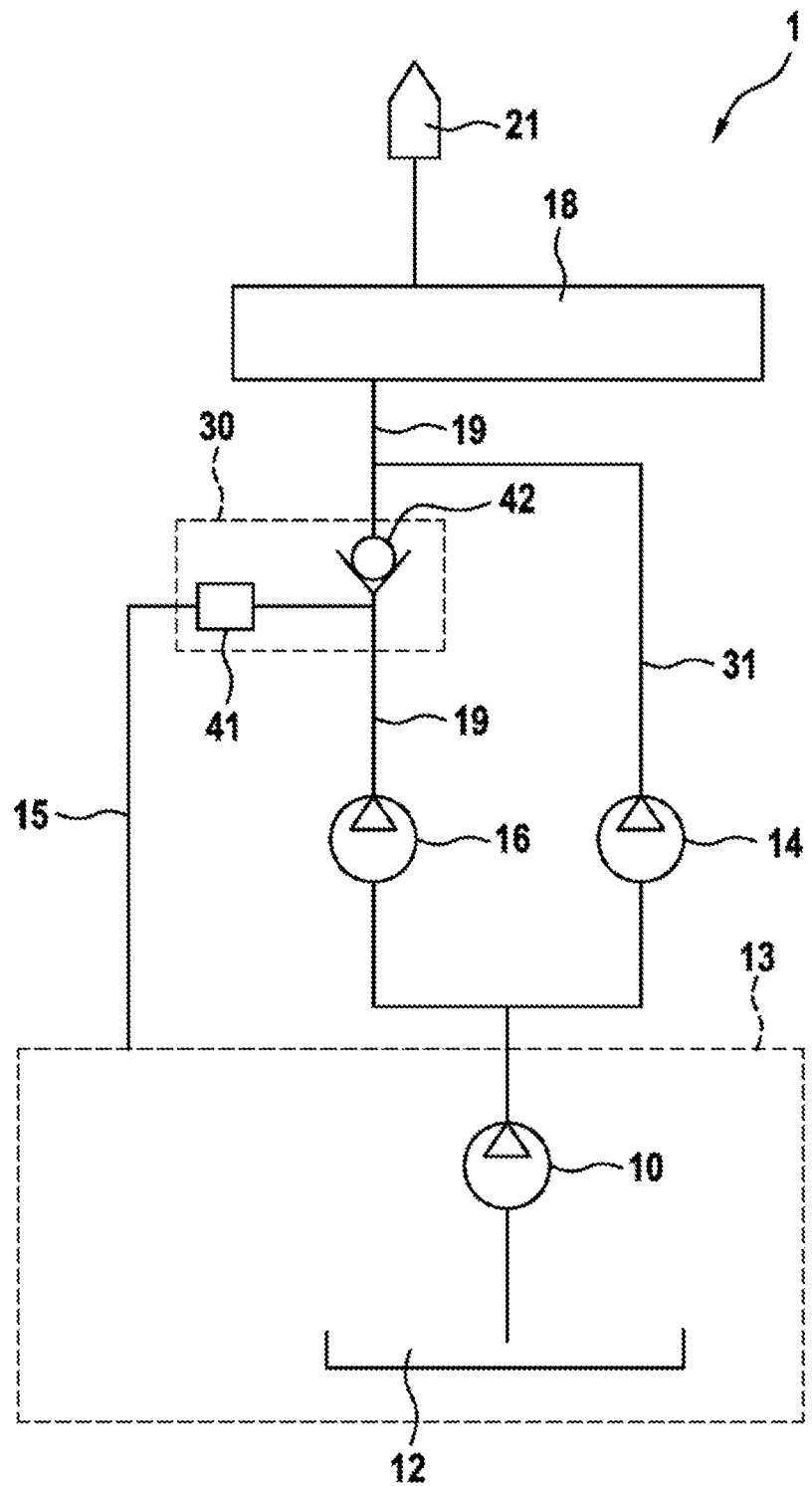
FIG. 3 is a schematic view of a fuel-pumping device of an internal combustion engine according to a third exemplary embodiment.

FIG. 3 shows a third exemplary embodiment. The control unit 30 comprises a flush valve 41 which is arranged in the discharge line 15. The flush valve 41 can be controlled pneumatically, electrically and hydraulically and opened or closed by means of a control unit (not shown in greater detail). The discharge line 15 branches off from a high-pressure connection 19 which connects the large high-pressure pump 16 to the high-pressure region 18 and is arranged between a non-return valve 42 and the large high-pressure pump 16.

The non-return valve 42 opens the connection between the discharge side of the large high-pressure pump 16 and the high-pressure region 18 when a preset opening pressure on the side facing the large high-pressure pump 16 is exceeded. Said opening pressure can be built up by the large high-pressure pump 16 even with low pump outputs when the flush valve 41 is closed. A return flow of fuel from the high-pressure region 18 towards the large high-pressure pump 16 is not possible through the non-return valve 42.

If the flush valve 41 is closed, then fuel is pumped into the high-pressure region 18 via the non-return valve 42 by the large high-pressure pump 16. If the flush valve 41 is open, then the total pump output of the large high-pressure pump 16 flows into the low-pressure region 13 via the discharge line 15. The pressure in front of the non-return valve 42 falls as soon as the large high-pressure pump 16 pumps into the low-pressure region 13, and therefore the non-return valve 42 closes.

The discharge side of the small high-pressure pump 14 is always connected to the high-pressure region 18. An ignition line 31 connects the small high-pressure pump 14 to the high-pressure line 19 in a region upstream of the non-return valve 42, which opens into the high-pressure region 18.

In another exemplary embodiment, the small high-pressure pump 14 can be in the form of an attachment on the large high-pressure pump 16 and can be driven by the large high-pressure pump 16. In this way, a mechanical interface for driving the small high-pressure pump 14 is omitted on the motor.

The invention claimed is:

1. A fuel-pumping device (1) for a fuel injection unit of an internal combustion engine, the fuel-pumping device comprising a large high-pressure pump (16) and a small high-pressure pump (14) which are arranged in parallel, the large high-pressure pump (16) and the small high-pressure pump (14) being configured to pump fuel from a low-pressure region (13) into a high-pressure region (18), the high-pressure region (18) being connected to at least one injector (21), further comprising a control unit (30) configured to control a total pump output of the large high-pressure pump (16) or the small high-pressure pump (14) into the low-pressure region (13) via a discharge line (15).

2. The fuel-pumping device (1) as claimed in claim 1, characterized in that a maximum pump output of the large high-pressure pump (16) is at least two times greater than a maximum pump output of the small high-pressure pump (14).

3. The fuel-pumping device (1) as claimed in claim 1, characterized in that the control unit (30) is a valve (33), which comprises two positions,
   so that in a first position, a connection between a discharge side of the large high-pressure pump (16) and the high-pressure region (18) and a connection between a discharge side of the small high-pressure pump (14) and the discharge line (15) is released, and
   in a second position, a connection between a discharge side of the small high-pressure pump (14) and the high-pressure region (18) and a connection between the discharge side of the large high-pressure pump (16) and the discharge line (15) is released.

4. The fuel-pumping device (1) as claimed in claim 1, characterized in that a discharge side of the large high-pressure pump (16) is connected either to the discharge line (15) or the high-pressure region (18) by means of the control unit (30).

5. The fuel-pumping device (1) as claimed in claim 4, characterized in that the small high-pressure pump (14) is always connected to the high-pressure region (18) by means of an ignition line (31).

6. The fuel-pumping device (1) as claimed in claim 4, characterized in that the control unit (30) is a valve (34), which comprises two positions,
   so that in a first position, a connection between the discharge side of the large high-pressure pump (16) and the high-pressure region (18) is released, and
   in a second position, a connection between the discharge side of the large high-pressure pump (16) and the discharge line (15) is released.

7. The fuel-pumping device (1) as claimed in claim 4, characterized in that the control unit (30) comprises a flush valve (41) which is arranged in the discharge line (15), the discharge line (15) being arranged between a non-return valve (42) and the large high-pressure pump (16) in a high-pressure connection (19).

8. The fuel-pumping device (1) as claimed in claim 1, characterized in that the small high-pressure pump (14) is mechanically coupled to the large high-pressure pump (16) such that the small high-pressure pump can be driven by means of said large high-pressure pump.

9. A method for pumping fuel in a fuel-pumping device (1) for a fuel injection unit of an internal combustion engine, the fuel-pumping device comprising a large high-pressure pump (16) and a small high-pressure pump (14) which are arranged in parallel, the large high-pressure pump (16) and the small high-pressure pump (14) being configured to pump fuel from a low-pressure region (13) into a high-pressure region (18), the method comprising, during gas operation of the fuel delivery device (1), pumping a total pump output of the large high-pressure pump (16) into the low-pressure region (13).

10. The fuel-pumping device (1) as claimed in claim 1, characterized in that a maximum pump output of the large high-pressure pump (16) is at least ten times greater than a maximum pump output of the small high-pressure pump (14).

11. The fuel pumping device as claimed in claim 3, where the valve (33) is a 4/2-way valve.

12. The fuel pumping device as claimed in claim 6, where the valve (34) is a 3/2-way valve.

* * * * *